C. SELLENSCHEIDT.
FILTER PRESS.
APPLICATION FILED MAY 22, 1915. RENEWED AUG. 16, 1916.
1,202,109.
Patented Oct. 24, 1916.
2 SHEETS—SHEET 2.
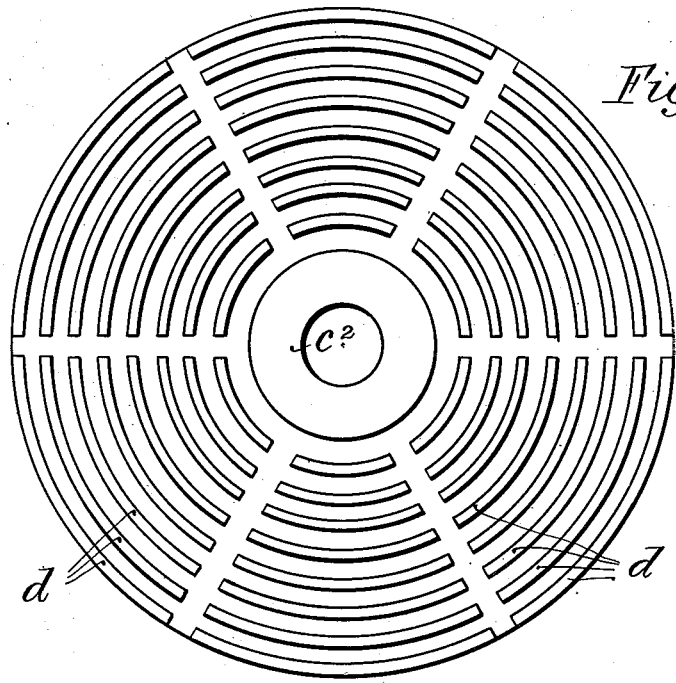
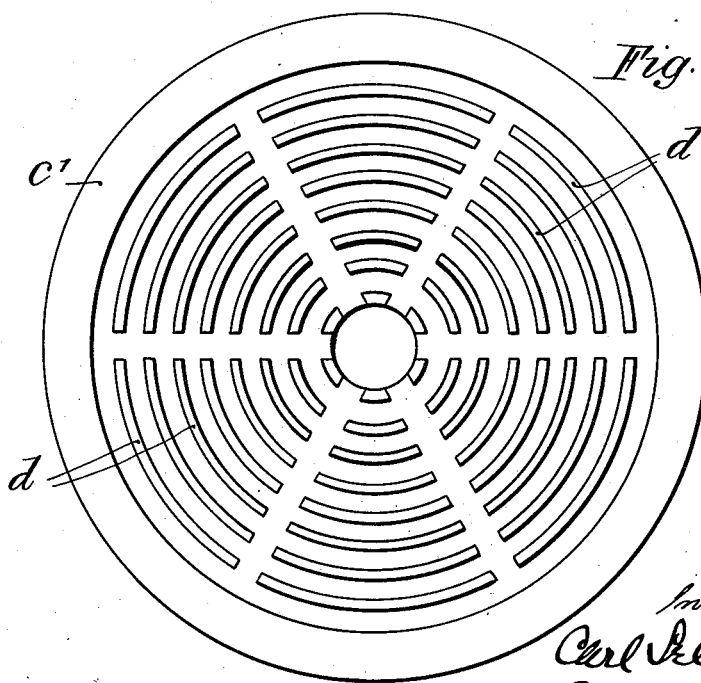

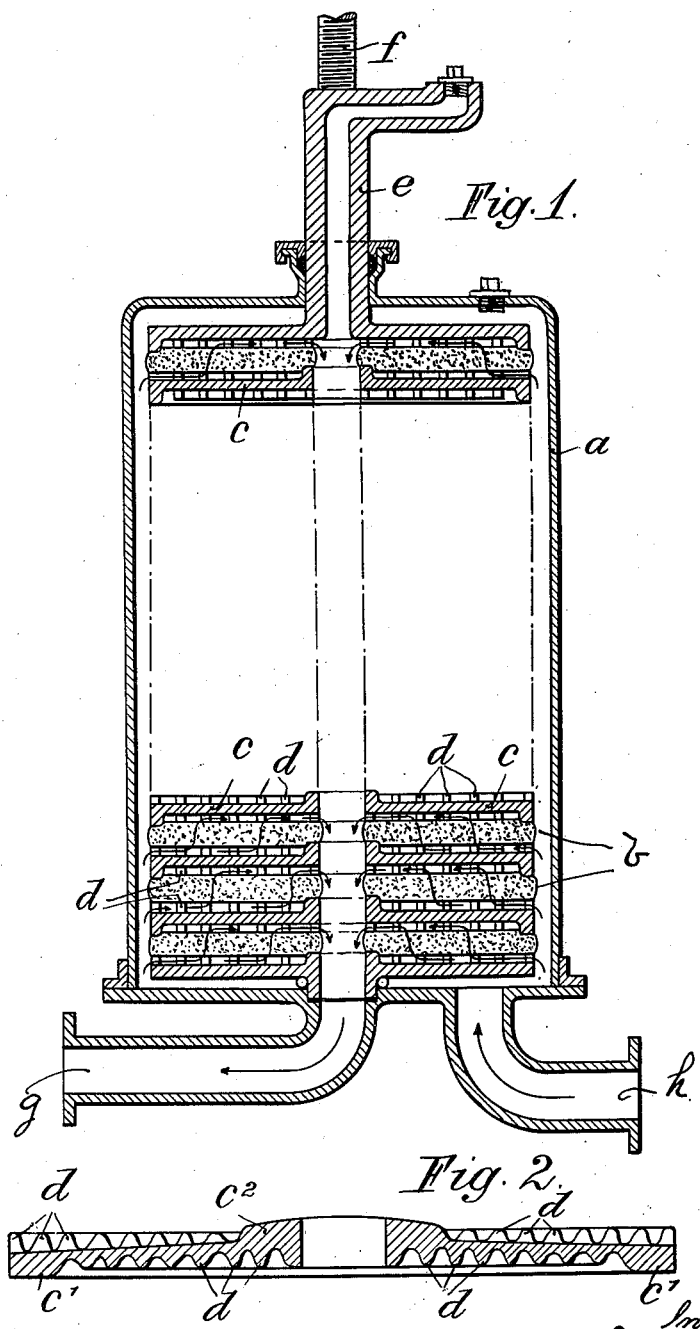

UNITED STATES PATENT OFFICE.

CARL SELLENSCHEIDT, OF BERLIN, GERMANY, ASSIGNOR TO FILTER & BRAUTECH-NISCHE MASCHINENFABRIK A. G. VORM. L. A. ENZINGER, OF BERLIN, GERMANY.

FILTER-PRESS.

1,202,109.  Specification of Letters Patent.  Patented Oct. 24, 1916.

Application filed May 22, 1915, Serial No. 29,776.  Renewed August 16, 1916.  Serial No. 115,338.

*To all whom it may concern:*

Be it known that I, CARL SELLENSCHEIDT, subject of the German Emperor, residing at Berlin, Germany, have invented new and useful Improvements in Filter-Presses, of which the following is a specification.

The invention relates to filters of the kind wherein a plurality of filter bodies, previously formed of pulp or fibrous material in a special press or mold, are built up in alternation with liquid conducting elements, and the whole subjected to pressure to hold the parts in operative assembly and to compress the filter bodies to the degree necessary for their action.

The object of the improvement is to cause the bodies of filter mass to be rendered equally dense throughout the filter, at the same time serving as self-packings to seal the joints, to minimize possibility of error in assembling, and to reduce cost of manufacture.

Where the filter bodies are contained in trays or frames, which are clamped together with interposed gaskets, equality of pressure under working conditions is not attained, because of variation in thickness or density in the bodies as assembled in the filter press, from which it results that certain layers are insufficiently compressed while others are subjected to excessive compression, the degree of pressure applied to the layers being limited in any case by the abutment of the trays or surrounding walls. In consequence of this condition the liquid to be filtered flows through the layers offering the least resistance in preference to those of compacter structure, so that the efficiency of the filter and the quality of the filtrate is impaired. In such filters, moreover, the gaskets between the trays are a disadvantage owing to their cost and the care and labor which they entail, and because they are subject to infection and wear, and require at intervals to be renewed.

In the present filter the bodies of filtering material are alternated with solid distributing disks, all of identical construction, formed with channels upon their opposite faces for conducting the unfiltered and filtered liquid, respectively, to and from the surfaces of the layers, and with bearing ribs distributed over their faces between the channels, the filter bodies constituting compressible spacing elements between the disks, so that when pressure is applied to the series the bodies are compressed equally and the packings are formed by the filtering material itself. In this press there are no frames or dishes and no gaskets, and the disks all being duplicates of each other possibility of error in assembling is reduced and an economy in manufacture is effected. The pressure for sealing the joints is preferably applied to the layers by marginal regions or flanges on the disks which are somewhat higher than the bearing ribs above-mentioned and sufficiently narrow to sink into the filter mass without substantially affecting the pressure over the filtering areas, but in contradistinction to other filters the filter bodies are of such character and the disks so formed that the ribs distributed over the faces of the solid disks have full bearing upon the filter material between the sealing regions, so that the equality of pressure in the bodies of the layers is realized, with consequent uniform density in the respective layers, irrespective of difference in thickness.

A further feature of the invention relates to the formation of the distributing channels, using this term in a general sense, including both the inlet and the outlet channels. Heretofore it has been customary to pierce the inlets or outlets of the channels through the material of the conducting elements, but such construction has the disadvantage of making the filter subject to clogging, which is avoided in the present invention by making the systems of channels, including their inlets and outlets, wholly open or trough-like, so that there are no pierced openings to become choked.

A preferred embodiment of the invention will now be described, reference being had to the accompanying drawings, wherein:

Figure 1 is a longitudinal section through the filter, which is illustrated somewhat schematically and with only a portion of its disks and filter layers represented; Fig. 2 is a diametrical section through one of the disks; Fig. 3 is a plan view of one disk face; and Fig. 4 is a similar view of the complementary form of face.

The filter consists of a cylindrical vessel *a*, in the bottom of which a concentric discharge pipe *g* and an eccentric inlet pipe *h* are provided. Into this vessel are piled the layers of filtering material *b* with interposed distributing disks *c* for the unfiltered and the filtered liquid, the said layers *b* being made of any suitable material of variable thickness. The layers *b* as also the distributing disks *c* have central bores, which form a central collecting channel for the filtrate. The liquid to be filtered rises in the annular passage formed by the inside wall of the vessel and the periphery of the filter body proper, is directed by the distributing disks to the underside of the filter layers and there distributed, so that it passes from there and from the projecting edge of the filter layer *b* through the filtering material and is thereby filtered.

The construction of the distributing disks may vary. In the exemplification shown in the drawing the same consist of a rigid plate, the diameter of which corresponds with that of the filter layer *b*. On the upper and lower side of the disks *c* webs, rings or lugs *d* are provided, which serve in known manner to support the filtering layers. Besides each distributing disk has on one side a continuous outer or circumferential flange, and on the opposite side a continuous inner central flange or boss, surrounding the central bore. By these flanges the spaces which are formed between the filter layer are alternately shut off from the annular space between the wall of the vessel and the pile of filter elements, and from the central filter channel. Thereby the liquid is forced to travel along the path indicated in Fig. 1 by arrows through the systems of distributing channels *k* formed between and intersecting the supporting ribs. In those faces which are provided with the plain central bosses or flanges $c^2$ these channels or a part thereof extend to the circumference, where their ends admit the unfiltered liquid. In the faces having the plain circumferential flanges $c^1$ the open channels are carried in like manner to the central openings, where they afford exits for the liquid which has passed through the filter layers. These faces alternate upon opposite sides of the disks, each of which is thus a duplicate of every other (except as to the end disks, which may have a special structure as suggested in the drawings). The channels, it will be observed, are of open or trough-like character throughout, and are therefore not subject to clogging.

Preferably the flanges $c^1$ at the periphery and $c^2$ at the bore of the distributing disks are allowed to slightly project so as to favor the production of a tight joint at these parts by an increased pressure on the filtering material. In Figs. 2, 3 and 4 distributing disks constructed in this manner are shown in section, top and bottom view, respectively. The section in Fig. 2 shows that the upper side of the disk rises toward the center, whereas the underside drops toward the outside, the disk thus being to a certain extent vaulted. This will facilitate the ventilation and the discharge of the filtrate.

The concentric ribs *d* on the upper side and underside of the distributing disks are provided, as evident from Figs. 3 and 4, with transverse or radial passages, which form a communication between the spaces between the several ribs.

The uppermost distributing disk is provided with a vent tube *e*, which passes through a gland in the lid of the vessel *a* into engagement with a compressing plunger or the like, indicated in the drawing as a compressing screw *f*. It is thereby possible, without opening the vessel, to exert a pressure on the uppermost distributing disk, and this pressure will be transmitted to the whole pile of filter elements. While the latter are being screwed together from the top the compression of the filtering material will be unrestricted.

The operation of the filter press constructed after the hereinbefore specified principles is as follows: The liquid to be filtered rises along the inside of the vessel *a*, enters partly from the periphery and partly from the underside of the filter layers *b* between the webs or lugs on the upper side (Fig. 3) of the distributing disks *c*, penetrates the filter layers and passes between the upper side of the filter layers and the undersides of the distributing disks provided with webs or lugs *d* (Fig. 4) in a filtered condition to the discharge channel. In starting the filter the air contained in it must be given a chance to escape. For this purpose the lid of vessel *a* and the tube *e* are provided with closable vents. If the filter layers are to be allowed to project on the outside beyond the distributing disks, in order that they shall be there compressed to a lesser degree and act as pre-filters, it is advisable to provide projecting ears or the like for supporting the thus projecting edge of the filter layer. The liquid to be filtered will then have to pass through this projecting edge of the filter layer before it can enter into the passages between the webs or lugs in the chambers for the unfiltered liquid beneath the packed part of the filter layer.

It is obvious that the distributing disks may be made of various materials, either of metal, caoutchouc, or the like, without and with reinforcements. The filter layers may also be made in a special manner so as to adapt themselves to the shape of the distributing disks.

In place of the screw compressor shown and described which allows of exerting a pressure on the upper distributing disk without opening the vessel, also an arrangement may be employed, with which a plunger may be forced downward in a barrel against the uppermost distributing disk.

This plunger may be moved by any suitable pressure medium. The compression of the filter layers and the distributing disks therebetween may also be automatically effected by the pressure within the vessel, by this pressure being allowed to act on the uppermost disk, and being transmitted, gradually diminishing, from element to element.

I claim:

1. A filter press comprising a casing and a superimposed alternating series of substantially centrally apertured disks and compressible bodies of filter mass, the disks of the series being solid and of identical construction, with systems of distributing channels on both faces, of which the channels upon one face of each disk have openings communicating with the peripheral space while those upon the opposite face have openings communicating with the longitudinal duct formed by the central apertures of the disks and filter bodies, the channels at one side of each disk being separated from those at the other side by the continuous wall of the disk, the disks being further provided with series of ribs in contact with and pressing upon the filter bodies over their surfaces throughout their filtering area and with relatively narrow sealing flanges at the center and periphery higher than the ribs to sink into the filter mass, whereby the filter is built up of disks all of the same kind by which the bodies of compressible filter mass are subjected to equal pressure throughout their filtering area and to gasket-forming pressure at the boundaries of said areas.

2. A filter press comprising a series of centrally apertured disks and filter layers therebetween, the faces of said disks being formed with systems of trough-like channels which communicate alternately with the peripheries and centers of the disks, being thus provided with inlets and outlets, the systems of channels including their inlet and outlet portions being formed wholly in the faces of the disks, that is to say, with their outer sides open 3. A filter press comprising a series of centrally apertured disks and filter layers therebetween, the faces of said disks being formed with systems of trough-like channels which communicate alternately with the peripheries and centers of the disks, being thus provided with inlets and outlets, the systems of channels including their inlet and outlet portions being formed wholly in the faces of the disks, that is to say, with their outer sides open, the disk faces being further provided in alternation with plain flanges at the centers and peripheries respectively, preventing mingling of the filtered and unfiltered portions of the liquid.

4. A filter press comprising a chamber for receiving the unfiltered liquid, a series of disks and filter layers in said chamber, the space between the peripheries of the disks and layers and the wall of the chamber being occupied by the unfiltered liquid and the disks and layers being centrally apertured to afford a conduit for the filtered liquid, the disks having faces of two kinds which are opposed to each other throughout the series, the faces of both kinds having systems of channels formed therein, the faces of one kind having inlets at their peripheries and continuous sealing flanges at their centers and the faces of the other kind having outlets at their centers and continuous sealing flanges at their peripheries, the said inlets and outlets together with the remainder of the systems of channels being formed wholly in the faces of the disks, that is to say with their outer sides open.

5. A filter press consisting of a plurality of filter layers and distributing disks for the unfiltered and the filtered liquid, packed alternately upon each other within a casing, the said distributing disks having webs adapted to support the filter layers, and flanges adjacent the center and periphery, but on different sides, alternately, adapted to form tight joints with said layers.

6. A filter press comprising a series of disks and pre-formed filter layers alternating therewith, the faces of said disks being provided with supporting webs and systems of channels, the said systems of channels being wholly open at their outer sides and in addition in alternate faces being open at the periphery and center, respectively, the faces being further provided with integral flanges to separate the spaces for the unfiltered and the filtered liquid, respectively.

In testimony whereof I have signed my name to this specification in the presence of two subscribing witnesses.

CARL SELLENSCHEIDT.

Witnesses:
 WOLDEMAR HAUPT,
 HENRY HASPER.